J. L. KELLOGG.
CEREAL FOOD AND PROCESS OF PRODUCTION.
APPLICATION FILED JUNE 10, 1919.
1,321,754.
Patented Nov. 11, 1919.
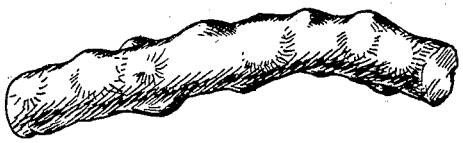
INVENTOR
John L. Kellogg
BY
Clarence L. Berger
ATTORNEY

UNITED STATES PATENT OFFICE.

JOHN L. KELLOGG, OF BATTLE CREEK, MICHIGAN.

CEREAL FOOD AND PROCESS OF PRODUCTION.

1,321,754. Specification of Letters Patent. Patented Nov. 11, 1919.

Application filed June 10, 1919. Serial No. 303,027.

*To all whom it may concern:*

Be it known that I, JOHN L. KELLOGG, a citizen of the United States, residing in the city of Battle Creek, county of Calhoun, and State of Michigan, have invented a new and useful Improvement in Cereal Foods and Processes of Production, of which the following is a specification.

My invention relates to the production of a ready to eat cereal food, from any suitable grain, such as corn, rice, oats, wheat or barley.

My invention consists briefly of a cereal food made and the process of making the same in the form of separate shreds, flakes or particles of other form by partially cooking the grain so as partially to dextrinize the starches therein; then partially drying the same; then forming the partially dextrinized and dried grains into shreds, flakes or other particles; then puffing the formed particles at a high temperature so as thoroughly to cook the same and to prepare it in a form ready for marketing, packing, storing and eating.

In order that my invention may be fully understood I shall first describe in detail the process which I at present prefer to use in making the new product and also the distinguishing characteristics of the product itself, and then point out the novel features of the invention in the claims.

Reference is to be had by numbers to the accompanying drawings forming part of this specification in which—

Figure 1, shows in magnified form one of the shreds prepared from corn after partially cooking, drying and shredding, but before puffing according to my improved process.

Fig. 2, shows in magnified form the said corn shred after partially cooking, drying, shredding and puffing to completion, according to my invention.

In the process of preparing the new cereal, I take a sufficient quantity of the grain selected, which in the present example is corn, but which may be rice, oats, wheat, barley or any other suitable grain, and cook the same for a sufficient period of time and at a proper temperature partially to dextrinize the starches in the grain.

The cooking may be performed by any approved means such as a common rotary steam cooker or in a steaming device commonly known as a steaming conveyer, where the grain is propelled through the steaming chamber by means of a special conveyer and steamed while passing through the conveyer with live steam.

The steam pressure may vary widely, and will depend to some extent on the time used in cooking, but we at present prefer to use a pressure of from 15 to 25 pounds, and to steam the grain for a period of from about fifteen (15) to sixty (60) minutes; but where a more thorough cooking of the grain is desired, the steaming process may continue from one to three hours according to the steam pressure.

After thus steaming the grain it is partially dried by any suitable means, such as a hot or cold air blast, cold air being generally preferable. Flavoring material such as a mixture of barley, malt, sugar and salt may be added to the grain by mixing it with the water used to cover the grain.

After thus cooking the grain so as to partially dextrinize the starches therein, and partially drying the product, the grain is formed into separate particles, such as shreds, flakes or individual elements of any other desired form.

I find that by forming the partially cooked, dextrinized and dried grain into particles in the shape of elongated shreds like that for example shown magnified in Fig. 1, by passing the partially cooked grain through suitable shredding rolls, a finished product of peculiar and unusual flavor, palatability and crispness and general desirability is obtained.

One form of fine shred I have found very advantageous is about a half inch or so in length, about one-eighth of an inch in width and about twenty to thirty thousandths of an inch in thickness.

The partially cooked and dried shreds or particles thus formed are then subjected to a temperature preferably of from about 325 degrees to 450 degrees Fahr. for a period of about six to ten minutes, in any suitable device, such as a rotary toasting oven, or other suitable oven, so as to puff the shreds or particles, forming a number of puffs or blisters on all sides of each individual shred or particle and complete the cooking of the same. One of the puffed shreds of corn thus completed is shown magnified in Fig. 2.

The cooked, partially dextrinized and puffed shreds or separate particles thus formed are then ready for marketing and packing. In this condition they will keep indefinitely without deterioration and are ready for serving, with milk or cream and sugar, as desired.

The puffed shreds or particles thus prepared are usually sweet and palatable, have a very appetizing appearance and owing to the peculiar process to which they have been subjected retain their individuality and crispness and will not mush up in milk or cream, and have a remarkably attractive and unique flavor.

Having thus described my new product and the process by which I at present prefer to prepare the same, I claim as my invention:

1. The process of preparing a ready to serve cereal from grain, in the performance of which the grain is heated for a period and at a temperature sufficient to dextrinize partially the starches; the partially cooked and dextrinized grain is then partially dried; is then formed into separate particles and the separate particles then subjected to a high temperature so as to puff the same.

2. The process of preparing a ready to serve cereal food from grain, in the performance of which the grain is subjected to the action of live steam so as to dextrinize partially the starches in the grain; the partially cooked and dextrinized grain is then partially dried; is then formed into elongated shreds and the shreds then subjected to approximately the effect of a temperature of about 325 degrees to 450 degrees Fahr. for about six to ten minutes, so as to puff the shreds and completely cook the same.

3. A puffed cereal food consisting of separate partially cooked and dextrinized and puffed particles of grain having a sweet and palatable flavor and the peculiar characteristics of retaining their puffed individual form when immersed in milk and not becoming mushy or pasty.

4. A puffed and shredded cereal food consisting of partially cooked and puffed elongated shreds of grain, the starches of which are partially dextrinized and having a sweet and palatable flavor, and having the peculiar characteristics of retaining their individual shredded form when immersed in milk or water and not becoming mushy or pasty.

5. A puffed cereal food consisting of separate partially cooked and dextrinized and puffed particles of grain mixed with flavoring material, having a sweet and palatable flavor and the peculiar characteristics of retaining their puffed individual form when immersed in milk and not becoming pasty or mushy.

JOHN L. KELLOGG.